(12) United States Patent
Samson et al.

(10) Patent No.: US 11,555,694 B2
(45) Date of Patent: Jan. 17, 2023

(54) METHOD AND SYSTEM FOR CONTROLLING A LASER PROFILER

(71) Applicant: SYSTEMES PAVEMETRICS INC., Quebec (CA)

(72) Inventors: Eric Samson, Quebec (CA); Jean-François Hebert, Quebec (CA); Richard Habel, Quebec (CA); Daniel Lefebvre, Quebec (CA)

(73) Assignee: SYSTEMES PAVEMETRICS INC., Quebec (CA)

( * ) Notice: Subject to any disclaimer, the term of this patent is extended or adjusted under 35 U.S.C. 154(b) by 194 days.

(21) Appl. No.: 16/931,603

(22) Filed: Jul. 17, 2020

(65) Prior Publication Data

US 2022/0018654 A1    Jan. 20, 2022

(51) Int. Cl.
| | | |
|---|---|---|
| *G01B 11/25* | (2006.01) | |
| *G01B 11/245* | (2006.01) | |
| *H04N 13/271* | (2018.01) | |

(52) U.S. Cl.
CPC ........ *G01B 11/2518* (2013.01); *G01B 11/245* (2013.01); *H04N 13/271* (2018.05)

(58) Field of Classification Search
CPC . G01B 11/2518; G01B 11/245; H04N 13/271
See application file for complete search history.

(56) References Cited

U.S. PATENT DOCUMENTS

| | | | | |
|---|---|---|---|---|
| 4,101,776 A * | 7/1978 | Mansfield | ................ | H05G 1/64 378/111 |
| 5,489,771 A * | 2/1996 | Beach | .................... | H05B 47/10 315/180 |
| 5,579,328 A * | 11/1996 | Habel | ................. | H01S 5/06832 372/38.1 |
| 6,950,717 B1 * | 9/2005 | Pierce | ...................... | D06H 3/08 26/74 |
| 10,393,512 B2 * | 8/2019 | Regan | ..................... | G06F 30/00 |
| 2005/0051466 A1 * | 3/2005 | Carter | .................. | G01N 15/042 210/512.1 |
| 2007/0131842 A1 * | 6/2007 | Ernst | ........................ | G01J 1/04 250/205 |
| 2010/0149551 A1 * | 6/2010 | Malinkevich | .......... | G01B 11/25 356/603 |
| 2018/0143009 A1 * | 5/2018 | Hibi | ..................... | G01B 11/306 |
| 2021/0116567 A1 * | 4/2021 | Heinonen | ............... | G01S 17/89 |

* cited by examiner

*Primary Examiner* — Dominic J Bologna
*Assistant Examiner* — Jarreas C Underwood
(74) *Attorney, Agent, or Firm* — Fasken Martineau Dumoulin LLP; Serge Lapointe

(57) ABSTRACT

A method for controlling a laser profiler, the laser profiler being configured for generating a laser line on a surface to be inspected, the method comprising: receiving an image of the laser line; determining an actual intensity of the laser line; calculating an amplification factor for the laser line based on the actual intensity of the laser line, a target intensity for the laser line, a power of the laser, a camera gain of the camera and an exposure time of the laser line on the surface to be inspected, the amplification factor allowing the actual intensity of the laser line to reach the target intensity while minimizing the power of the laser; and based on the calculated amplification factor, adjusting at least one parameter of the laser profiler so that the actual intensity of the laser line corresponds to the target intensity.

22 Claims, 12 Drawing Sheets

METHOD AND SYSTEM FOR CONTROLLING A LASER PROFILER

TECHNICAL FIELD

The present invention relates to the field of 3D laser profiler, and more particularly to methods and systems for controlling a 3D laser profiler.

BACKGROUND

Laser profilers are used for sensing the surface of objects or elements such as roads and generating a 3D map or image of the sensed surface. In order to obtain a precise measurement of the surface, a large and constant laser power is usually used. While it ensures a good quality of measurement, using such a large laser power usually reduces the lifespan of the laser in addition to generating heat that needs to be evacuated.

Therefore, there is a need for an improved method for controlling and operating a laser profiler.

SUMMARY

According to a first broad aspect, there is provided a method for controlling a laser profiler, the laser profiler being configured for generating a laser line on a surface to be inspected and comprising at least a laser and a camera, the method comprising: receiving an image of the laser line on the surface to be inspected; determining an actual intensity of the laser line from the received image; calculating an amplification factor for the laser line based on the actual intensity of the laser line, a target intensity for the laser line, a power of the laser, a camera gain of the camera and an exposure time of the laser line on the surface to be inspected, the amplification factor allowing the actual intensity of the laser line to reach the target intensity while minimizing the power of the laser; and based on the calculated amplification factor, adjusting at least one parameter of the laser profiler so that the actual intensity of the laser line corresponds to the target intensity.

In one embodiment, the step of adjusting the at least one parameter of the laser profiler comprises varying at least one of the power of the laser, the camera gain and the exposure time.

In one embodiment, when the calculated amplification factor is less than one, the step of varying the at least one of the power of the laser, the camera gain and the exposure time comprises: decreasing the power of the laser; if the power of the laser has reached a minimum power value, decreasing the camera gain; and if the camera gain has reached a minimum gain value, decreasing the exposure time.

In one embodiment, the method further comprises when the amplification factor is greater than one: increasing the exposure time; if the exposure time has reached a maximum time value, increasing the camera gain; and if the camera gain has reached a maximum gain value, increasing the power of the laser.

In one embodiment, the step of adjusting the at least one parameter of the laser profiler comprises: comparing the power of the laser to a minimum power laser and the exposure time to a maximum exposure time; and if the power of the laser is greater than the minimum power laser and the exposure time is less than the maximum exposure time, concurrently decreasing the power of the laser and increasing the exposure time.

In one embodiment, the steps of comparing and concurrently decreasing the power of the laser and increasing the exposure time are performed prior to said receiving the target intensity and said receiving the image of the laser line.

In one embodiment, the method further comprises varying the target intensity for the laser line.

In one embodiment, the laser line comprises plurality of longitudinal points therealong and the actual intensity of the laser line is determined based on an intensity value assigned to each one of the longitudinal points.

In one embodiment, the intensity value for a given one of the longitudinal points corresponds to a maximum intensity for transverse points of the laser line contained in a cross-section of the laser line at the given one of the longitudinal points.

In one embodiment, the actual intensity of the laser line corresponds to a predefined percentile rank of a distribution of the intensity values of the longitudinal points.

According to another broad aspect, there is provided a system for controlling a laser profiler, the laser profiler being configured for generating a laser line on a surface to be inspected and comprising at least a laser and a camera, the system comprising: an intensity determining unit for: receiving an image of the laser line on the surface to be inspected; and determining an actual intensity of the laser line from the received image; an amplification factor calculator for: receiving a target intensity for the laser line; and calculating an amplification factor for the laser line based on the actual intensity of the laser line, the target intensity for the laser line, a power of the laser, a camera gain of the camera and an exposure time of the laser line on the surface to be inspected, the amplification factor allowing the actual intensity of the laser line to reach the target intensity while minimizing the power of the laser; and a controller for: adjusting at least one parameter of the laser profiler based on the calculated amplification factor, so that the actual intensity of the laser line corresponds to the target intensity.

In one embodiment, the controller is configured for varying at least one of the power of the laser, the camera gain and the exposure time.

In one embodiment, when the calculated amplification factor is less than one, the controller is configured for: decreasing the power of the laser; if the power of the laser has reached a minimum power value, decreasing the camera gain; and if the camera gain has reached a minimum gain value, decreasing the exposure time.

In one embodiment, when the amplification factor is greater than one, the controller is further configured for: increasing the exposure time; if the exposure time has reached a maximum time value, increasing the camera gain; and if the camera gain has reached a maximum gain value, increasing the power of the laser.

In one embodiment, the controller is configured for: comparing the power of the laser to a minimum power laser and the exposure time to a maximum exposure time; and if the power of the laser is greater than the minimum power laser and the exposure time is less than the maximum exposure time, concurrently decreasing the power of the laser and increasing the exposure time.

In one embodiment, the controller is configured for executing said comparing and said concurrently decreasing the power of the laser and increasing the exposure time prior to said receiving the target intensity and said receiving the image of the laser line.

In one embodiment, the amplification factor calculator is further configured for varying the target intensity for the laser line.

In one embodiment, the laser line comprises plurality of longitudinal points therealong and the intensity determining unit is configured for determining the actual intensity of the laser line based on an intensity value assigned to each one of the longitudinal points.

In one embodiment, the intensity value for a given one of the longitudinal points corresponds to a maximum intensity for transverse points of the laser line contained in a cross-section of the laser line at the given one of the longitudinal points.

In one embodiment, the actual intensity of the laser line corresponds to a predefined percentile rank of a distribution of the intensity values of the longitudinal points.

According to further broad aspect, there is provided a computer program product comprising a non-volatile computer readable memory storing computer executable instructions thereon that when executed by a computer perform steps of: receiving an image of the laser line on the surface to be inspected; determining an actual intensity of the laser line from the received image; calculating an amplification factor for the laser line based on the actual intensity of the laser line, a target intensity for the laser line, a power of the laser, a camera gain of the camera and an exposure time of the laser line on the surface to be inspected, the amplification factor allowing the actual intensity of the laser line to reach the target intensity while minimizing the power of the laser; and outputting the calculated amplification factor.

In one embodiment, the step of outputting the calculated amplification factor comprises determining an adjustment for at least one parameter of the laser profiler based on the calculated amplification factor so that the actual intensity of the laser line corresponds to the target intensity, and outputting a command indicative of the adjustment for the at least one parameter of the laser profiler.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
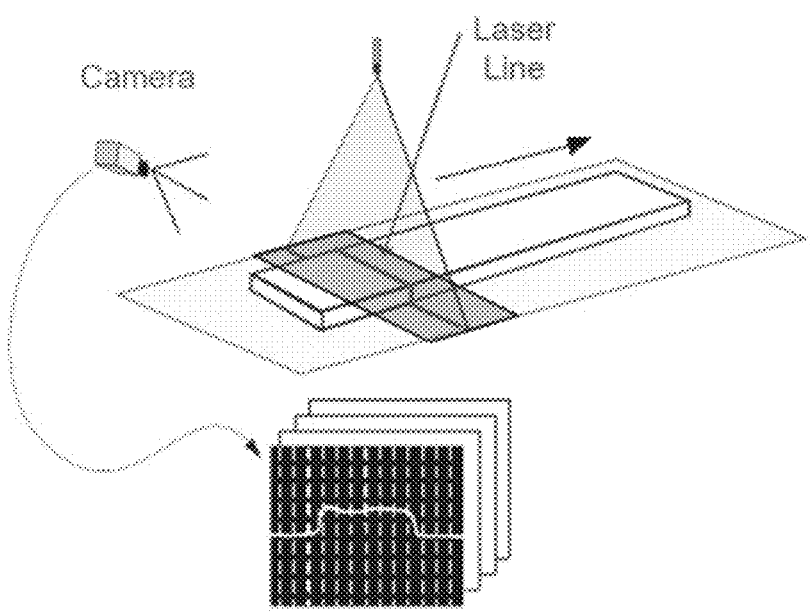
FIG. 1a illustrates a 3D laser profiler, in accordance with the prior art.
Figure 1B:
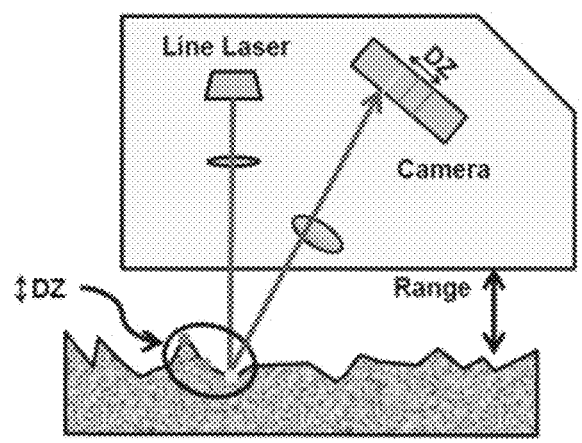
FIG. 1b illustrates the emission and reception of a laser line by the 3D laser profiler of FIG. 1a, in accordance with the prior art.

A three-dimensional (3D) laser profiler combines a laser line projector and a camera to produce a 3D depth map of a surface. The laser line projector comprises a laser and optics for shaping the laser beam emitted by the laser into a laser plane. As illustrated at FIG. 1a, the laser plane created by the laser line projector intersects the surface to be digitized, thereby creating a laser line extending along a longitudinal axis on the surface to be digitized. The camera usually has a fixed position relative to the laser line projector and points toward the intersection of the laser plane with the surface. A side view of such arrangement is illustrated at FIG. 1b. As illustrated, the position of a given point of the laser line on the image plane of the camera is a function of the distance between the corresponding point on the surface and the device. That is, there is a one-to-one mapping between the position of the laser point in the image and the distance of the corresponding point on the surface. This allows for distance measurement based on observation of the laser line captured by the camera.

Figure 1C:
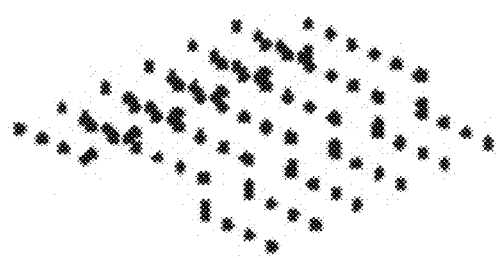
FIG. 1c illustrates exemplary 3D depth map acquired by a 3D laser profiler, in accordance with the prior art.

The capture of one image of the laser line allows to produce what it is referred to as one 3D profile, which corresponds to a series of 3D measurements made along the intersection between the laser plane and the surface. Typically, one measurement point is produced for each active column of the image sensor of the camera. To produce a complete 3D depth map of a surface, the 3D laser profiler and the surface must move relative to each other. Usually, only one of those elements is moving, e.g. the 3D laser profiler moves relative to a fixed surface. FIG. 1c illustrates an exemplary 3D depth map obtained by combining the temporally successive profiles captured while the surface is being scanned.

The cross section of the actual laser line imaged on the image plane of the camera (i.e. the section of the laser line orthogonal to the longitudinal axis of the laser line) usually shows an intensity distribution similar to a Gaussian function, i.e. the light intensity smoothly increases up to a maximum value symmetrically from both sides.

In the context of a 3D laser profiler, a whole set of cross sections of the laser line is usually to be analyzed on each digitized image. The intensity of a laser line seen by the camera differs from point to point along the laser line. The intensity also changes from one image to the other as the 3D laser profiler and the object being scanned move with respect to each other. The fact that the intensity of the laser line changes both across the image and over the time may makes the optimization of the dynamic range a non-trivial task.

Figure 2A:
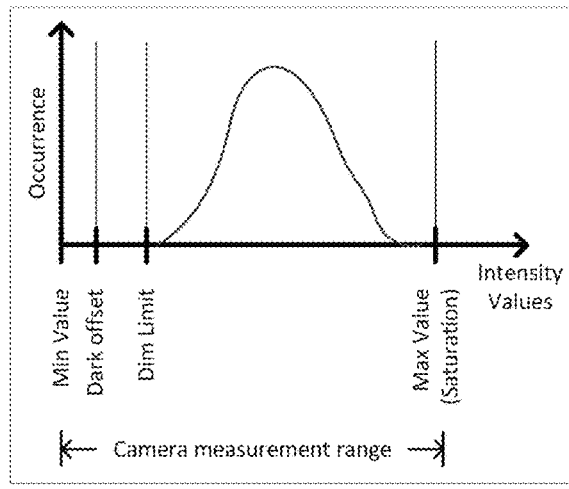
FIG. 2a illustrates an exemplary histogram of an ideal distribution of intensity points, in accordance with the prior art.

In one embodiment, the evaluation as to whether the intensity of the laser line is properly set is performed by analyzing the distribution of intensity values of profile points collected through a test scan representative of the expected conditions of use of the 3D laser profiler. The intensity value of a given profile point (i.e. the intensity value of a given longitudinal point along the laser line) is often defined as being the maximum intensity value of the corresponding cross section of the laser line in the image (i.e. the maximum intensity of the transverse points contained in the cross-section of the laser line taken at the given longitudinal point). A histogram representation of the intensity information helps to visualize the distribution. FIG. 2a illustrates an exemplary histogram of an ideal case.

As illustrated in FIG. 2a, four threshold values may be defined: a minimum value, a dark offset, a dim limit and a maximum value.

The minimum value corresponds to the lower limit of the measurement range of the camera.

In one embodiment, all profile points having an intensity value being less than or equal to the dark offset are assumed to be invalid. Those points typically correspond to situations for which the laser light is not returned back to the image for one of the following exemplary reasons: a hole in the surface to be analyzed, a shadow effect and an out of range situation.

A shadow effect occurs in case of a camera line of sight occlusion or a laser source occlusion. In the first case, the occlusion prevents the camera from detecting a specific area of the surface to be analyzed. In the second case, the occlusion prevents the laser plane from illuminating a given area of the surface to be analyzed. An occlusion may also be caused by the geometry of the surface itself or by the presence of another object.

An out of range situation occurs when a given area of the surface is outside the active field of view of the camera such as when the given area is too close or too far from the camera.

The dim limit corresponds to the threshold value below which the accuracy of the 3D measurement is compromised. Below the dim limit, the effect of quantization error causes the accuracy of the 3D measurements to be outside the specifications of the profiler. The dim limit may be determined empirically for each specific camera model, laser model and geometric configuration combination.

The maximum value corresponds to the upper limit of the measurement range of the camera. This is also called saturation. Any intensities beyond the measurement range of the camera will be attributed the saturation intensity value.

In one embodiment, based on the four above-defined threshold values and the fact that the intensity value of profiles points must be maximized, the optimization of the dynamic range must be performed according to the following criterions:

maximizing the overall intensity of all profile points;
avoiding points at saturation limit; and
avoiding points below the dim limit.

Due to intensity variations from one profile to another and from one scan to another, ensuring that criterions 2 and 3 are met over time implies that the intensity distribution obtained from a representative test scan lies within an interval that begins higher than the dim limit and ends lower than the saturation limit. The histogram illustrated in FIG. 2a represents a such desired distribution.

Figure 2B:
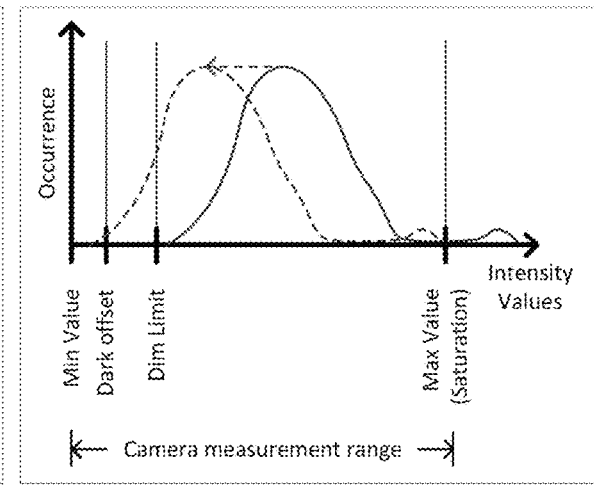
FIG. 2b illustrates a first exemplary histogram of a distribution comprising points above a saturation limit and a second exemplary distribution comprising points below a dim limit, in accordance with the prior art.

Actual situations where the above-mentioned criterions 2 and 3 cannot be encountered are common. One instance occurs when the surface to be scanned presents some sparse but highly reflective points. FIG. 2b illustrates the histogram for such a scenario. Avoiding any saturated point in such a situation would result in a very dark laser line on most part of the surface, thereby missing the global objective of dynamic range optimization. Also, this may push a part of the distribution below the dim limit. It is better to ignore those sparse saturated points in the optimization process and cope with them by proper identification and handling mechanism.

Figure 2C:
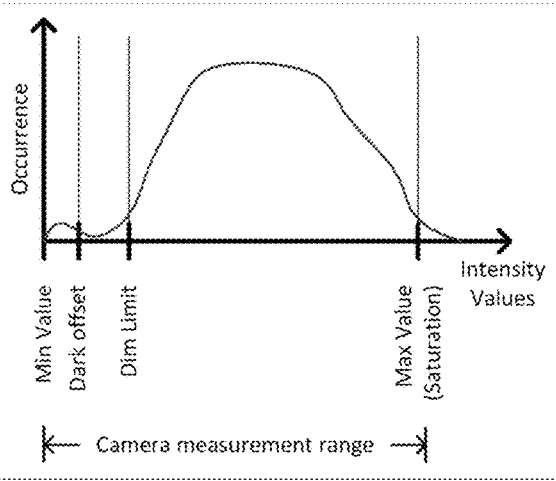
FIG. 2c illustrates a first exemplary histogram of an exemplary wide distribution of intensity points, in accordance with the prior art.

Another instance of situations where the above-mentioned criterions 2 and 3 cannot be encountered occurs when the intensity distribution is too wide to lie within the interval between the dim and saturation limits, as illustrated at FIG. 2c. In such a case, the number of points outside the range must be minimized as they usually cannot be strictly avoided.

Points below the dark offset represent special cases that could occur in any situations and must be ignored in the optimization of the dynamic range. Those points most likely correspond to areas of the surface that could not be measured for diverse reasons (e.g. presence of a hole, presence of a shadow or out of range area). As those points do not represent actual measurements of the laser line, any attempt to increase the overall intensity of the laser line will not influence their intensity.

Figure 2D:
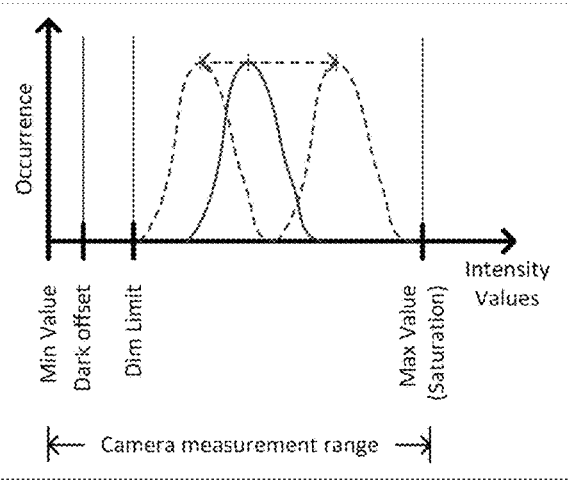
FIG. 2d illustrates a first exemplary histogram of an exemplary narrow distribution of intensity points, in accordance with the prior art.

FIG. 2d illustrates a very narrow intensity distribution. This occurs when the reflective properties of scanned surfaces are very uniform for example.

As explained above, the intensity of the laser line captured by the camera of a 3D laser profiler must lie within a given range to ensure accuracy of the produced 3D data. The intensity of the laser line mainly depends on the reflexivity of the scanned surface, the power of the laser, the camera exposure time and the camera gain. Usually 3D profilers are designed and adjusted so as to generate profiles at a target intensity for a broad range of surfaces characteristics using a nominal laser power, a fixed exposure time and a zero-percent camera gain.

In some embodiments, per-application adjustments of one or more of the parameters that influence the laser line intensity is sometime needed when the reflectivity of the surface to be scanned differs from the general case. An automatic control mechanism of the laser line intensity is generally used to cope with either moderate surface reflectivity changes from one scan to another or high but localized surface reflectivity changes. Automatic control mechanism is also useful to automatically handle part of per-application adjustments. Such as automatic control is usually achieved by dynamic adjustments of the camera gain or the exposure time while the laser power is held constant. However, maintaining the laser power constant is not efficient since in many cases the laser power could be decreased while the precision of the measurement may be maintained.

It is an object of the present technology to allow a dynamic control of a 3D laser profiler while minimizing the laser power use. Laser operation produces heat that must be evacuated by a heat management system. When operating the laser profiler in a warm environment, heat production may be a concern as the heat management system may be pushed to its limits. In such a circumstance, it is be desirable to minimize the laser power consumption. Furthermore, minimizing the laser power consumption also increases the laser lifespan.

Figure 3:
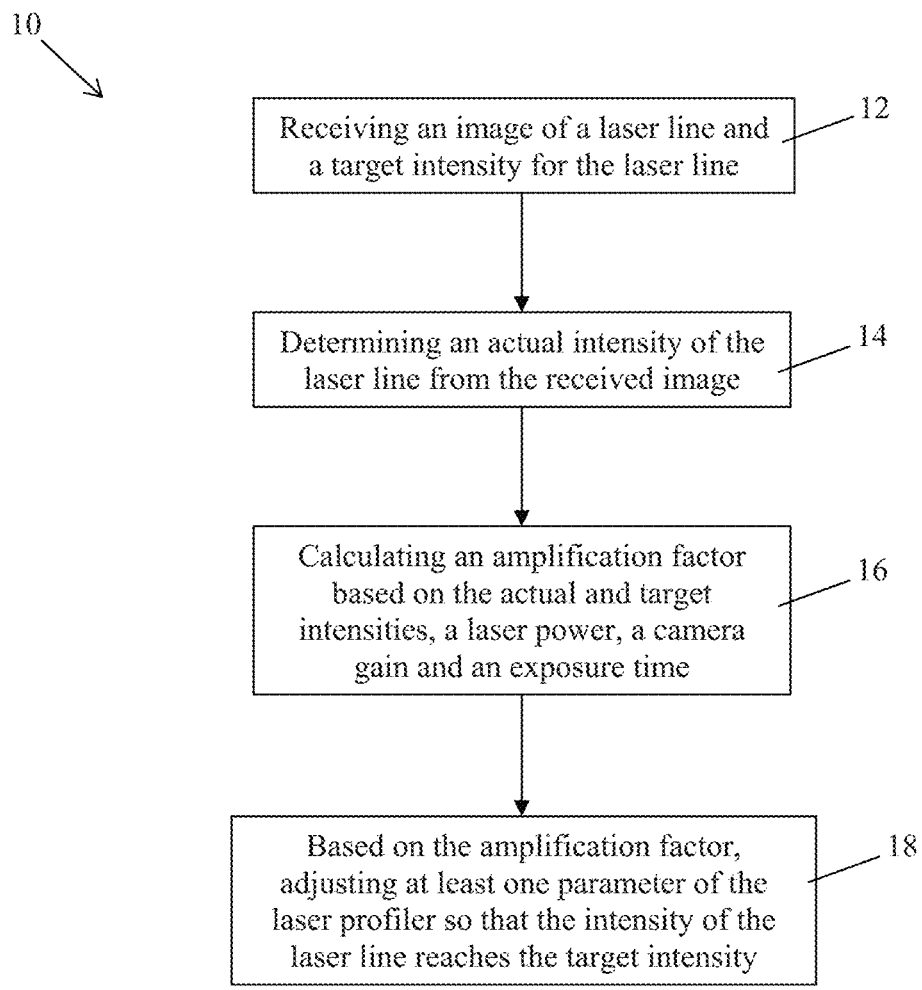
FIG. 3 is a flow chart illustrating a method for controlling a 3D laser profiler comprising the calculation of an amplification factor, in accordance with a first embodiment.

FIG. 3 illustrates one embodiment of a method 10 for controlling a laser profiler while minimizing laser power consumption. The laser profiler comprises at least a laser and adequate optics for generating a laser line on a surface to be analyzed, and a camera for capturing the laser line illuminating the surface. The camera outputs an image representing at least the portion of the surface illuminated by the laser line, hereinafter referred to as an image of the laser line. As described below, the laser profiler is further provided with a controller for setting parameters of the laser and the camera to desired values.

The first step 12 of the method 10 consists in receiving an image of the laser line on the surface to be analyzed and a target intensity for the laser line. The received image is captured by the camera and comprises a representation of a portion of the surface to be analyzed and at least a portion of the laser line illuminating a section of the surface. The target intensity for the laser line may be predefined and chosen as a function of the surface to be scanned for example. In one embodiment, the target intensity may be empirically determined.

At step 14, the actual intensity of the laser line is determined from the received image of the laser line.

In one embodiment and in order to determine the actual intensity of the laser line, the intensity of given longitudinal points located along the longitudinal axis of the laser line is determined. In one embodiment, the intensity of a longitudinal point is determined based on the intensity of the transverse points of the laser line located along the cross-section of the laser line being orthogonal to the longitudinal axis and taken at the longitudinal point. It should be understood that different methods may be used for determining the intensity of a longitudinal point based on the intensity of the transverse points associated with the longitudinal point. In one embodiment, the intensity of a longitudinal point corresponds to the maximum intensity of the transverse points associated with the longitudinal point, i.e. the intensity assigned to the longitudinal point is the intensity of the transverse point having the highest intensity amongst the transverse points. In another embodiment, the intensity of a longitudinal point corresponds to the mean of the intensities of the transverse points belonging to the close neighborhood of the transverse point having the highest intensity. In a further embodiment, and based on the fact that transverse points correspond to the digitized version of the actual intensity signal along the cross-section of the laser line taken at the longitudinal point, the intensity value of a longitudinal point is the maximum value of the intensity signal along the cross section, that maximum value being estimated by any signal recovering schemes based on intensity value of transverse points.

The actual intensity of the laser line is then determined from the determined intensities of the longitudinal points. It should be understood that different methods may be used for determining the actual intensity of the laser line based on the intensities of the longitudinal points. In one embodiment, the actual intensity of the lase line corresponds to the mean of the intensities of the longitudinal points. In another embodiment, the actual intensity of the lase line corresponds to the median of the intensities of the longitudinal points. In a further embodiment, the actual intensity of the lase line may correspond to a given percentile rank of the distribution of the intensities of the longitudinal points.

As the actual intensity of the laser line is determined based on the intensity of the transverse points, it should be understood that step 14 comprises first determining the intensity of each longitudinal point based on the intensity of the transverse points associated with the longitudinal point and then determining the actual intensity of the laser line based on the intensity of the longitudinal points.

Once the actual intensity of the laser line has been determined, the next step 16 consists in determining the value of an amplification factor based on the actual intensity of the laser line and the received target intensity for the laser line. The amplification factor indicates whether the actual intensity of the laser line is below the target intensity, equal to the target intensity or greater than the target intensity. In one embodiment and as described below, the amplification factor is calculated further based on the actual intensity or power of the laser beam emitted by the laser of the profiler (hereinafter referred to as the laser power), the actual gain of the camera of the laser profiler and the actual exposure time of the laser line, and further based on minimum and maximum values for the laser power, the camera gain and the exposure time. In this case, the amplification factor is determined based on the actual and target intensities of the laser line, the actual, minimum and maximum laser powers, the actual, minimum and maximum camera gains and the actual, minimum and maximum exposure times.

In one embodiment, the amplification factor is chosen so that the intensity of the laser line reaches the target intensity for the laser line while minimizing the laser power used for generating the laser line having the target intensity, i.e. minimizing the laser power consumption.

At step 18, at least one parameter of the laser profiler is adjusted based on the determined amplification factor so that the intensity of the laser line be substantially equal to the target intensity for the laser line. In one embodiment, the identification of the given parameter(s) to be adjusted is determined based on the value of the determined amplification factor. In the same or another embodiment, the amount by which the parameter(s) of the laser profiler must be adjusted is determined based on the value of the amplification factor.

In one embodiment, only one parameter of the laser profiler is adjusted at step 18. In another embodiment, at least two parameters of the laser profiler may be adjusted at step 18. In one embodiment, at least two parameters are iteratively adjusted, e.g. a first parameter is adjusted to a given value and the value of a second parameter is subsequently adjusted. In another embodiment, at least two parameters are concurrently adjusted at step 18.

In one embodiment, the parameters of the laser profiler that may be adjusted at step 18 comprise the laser power, the camera gain and the exposure time.

In one embodiment, the determined amplification factor is compared to a threshold or reference value and the parameter(s) to be adjusted and/or the amount by which the parameter must be adjusted is determined based on the determined value and reference value of the amplification factor.

In one embodiment, when the calculated amplification factor is less than the reference value for the amplification factor, the intensity of the laser line must be decreased which may be achieved by decreasing the laser power, the camera gain and/or the exposure time. In one embodiment, the decrease of the laser power is privileged over the decrease of the camera gain and the decrease of the exposure time, and the decrease of the camera gain is privileged over the decrease of the exposure time.

In one embodiment, when the calculated amplification factor is greater than the reference value for the amplification factor, the intensity of the laser line must be increased, which may be achieved by increasing the laser power, the camera gain and/or the exposure time. In one embodiment, the increase of the exposure time is privileged over the increase of the camera gain and the increase of the laser power, and the increase of the camera gain is privileged over the increase of the laser power.

In one embodiment, when the calculated amplification factor is substantially equal to the reference value for the amplification factor, no adjustment is performed.

In one embodiment, the threshold or reference value for the amplification factor is normalized so as to be equal to 1.

In one embodiment, the method 10 further comprises a step of varying the value of the target intensity for the laser line.

It should be understood that the method 10 may be repeated while the surface to be analyzed is scanned such as each time a new image of the surface is generated.

In one embodiment, the method 10 may be embodied as a computer-implemented method. In this case, the step 18 consists in transmitting to the controller of the laser profiler a command indicative of the adjustment for the parameter(s) of the laser profiler.

In a further embodiment, the method 10 may be embodied as a computer program product comprising a non-volatile computer readable memory storing computer executable instructions thereon that when executed by a computer perform steps 12-16 in addition to a step of outputting the calculated amplification factor. In one embodiment, the step of outputting the amplification factor comprises determining the adjustment of at least one parameter of the laser profiler and outputting a command indicative of the determined adjustment. The command may be sent to the controller of the laser profiler.

Figure 4:
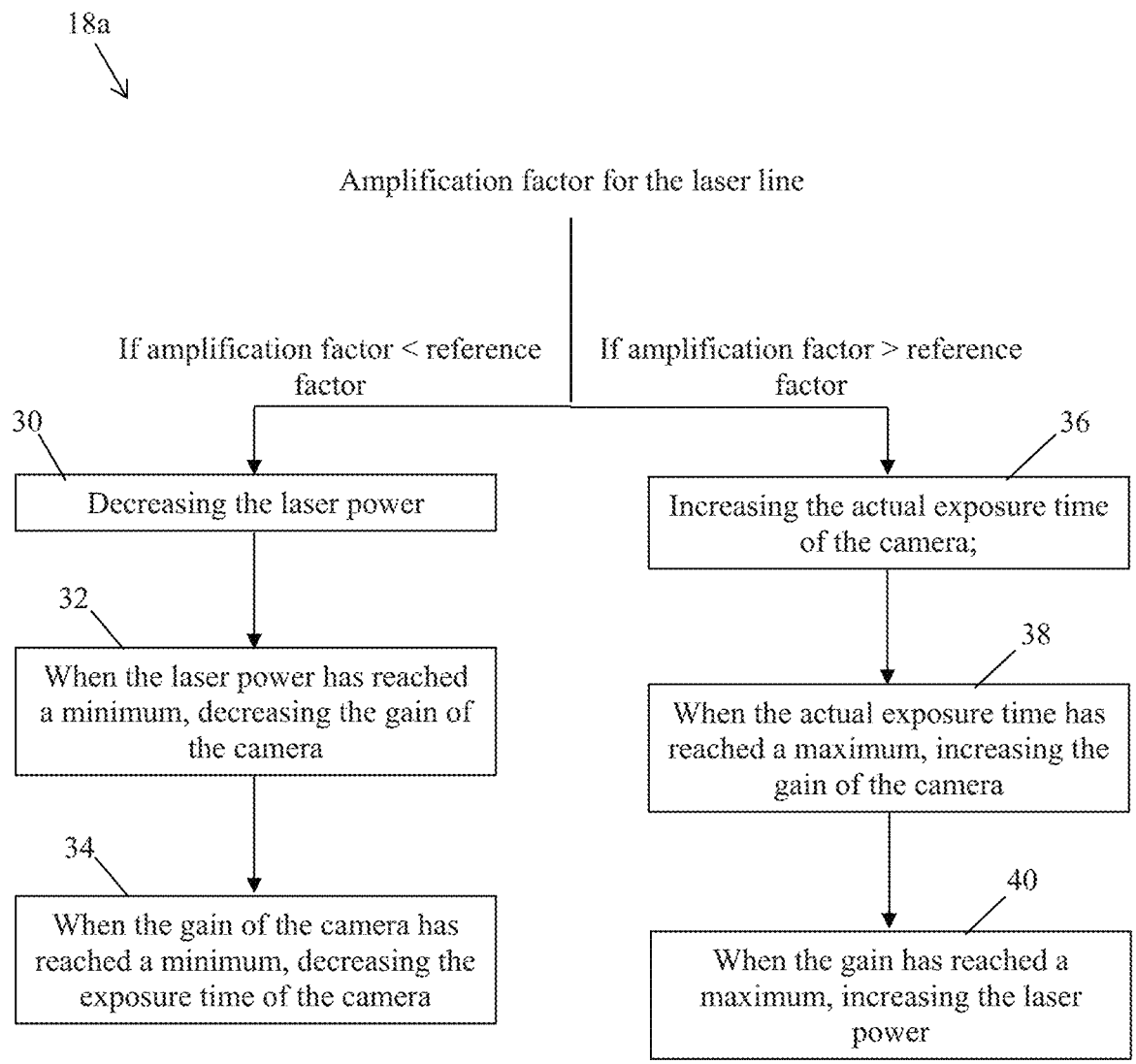
FIG. 4 is a flow chart illustrating a method for adjusting a parameter of the 3D laser profiler using the amplification calculated using the method of FIG. 3, in accordance with an embodiment.

FIG. 4 illustrates one embodiment of a method 18a for performing step 18 of the method 10. The method 18a is chosen so as to minimize the laser power consumption, i.e. when the intensity of the laser line has to be decreased, a decrease of the laser power is favored and when the intensity of the laser line must be increased, the increase of the laser power represents the last option.

The input of method 18a is the amplification factor calculated at step 16 of the method 10. The calculated amplification factor is compared to the reference value for the amplification factor.

If the calculated amplification factor is less than the reference amplification factor, the first step 30 consists in reducing the laser power while maintaining the laser power at least equal to the minimum laser power.

If the target intensity for the laser line can be reached while maintaining the laser power at least equal to the minimum laser power, the method 18a stops.

If the intensity of the laser line is still greater than the target intensity for the laser line while the laser power has reached the minimum laser power, then the camera gain is decreased at step 32.

If the target intensity for the laser line can be reached while maintaining the camera gain at least equal to the minimum camera gain, the method 18a stops.

If the intensity of the laser line is still greater than the target intensity for the laser line while the camera gain has reached the minimum camera gain, then the exposure time of the camera is decreased at step 34 until the intensity of the laser line reaches the target intensity. As soon as the intensity of the laser line has reached the target intensity, the decrease of the exposure time of the camera is stopped.

In one embodiment, the exposure time of the camera must remain at least equal to a minimum exposure time. In this case, if at step 34 the exposure time has been decreased down to the minimum exposure time and the intensity of the laser line is still greater than the target intensity, no more action is taken.

In one embodiment, the steps 30-34 are iteratively performed. In this case, the intensity of the laser line may be measured to determine whether the target intensity has been reached. In another example, the intensity of the laser line may be estimated using the new value for the first parameter to be adjusted and if the new value for the intensity of the laser line is still greater than the target intensity and the first parameter is set to its minimum value, then a new value for the second parameter to be adjusted is determined and the impact of the intensity of the laser line is estimated. Doing so, it is possible to estimate the value of the intensity of the laser line as a function of the decrease of the parameter(s) and to determine, prior to any parameter adjustment, which parameter should be adjusted and the amount of required adjustment so that the intensity of the laser line reaches its target value.

In another embodiment, the steps 30-34 may be concurrently performed, i.e. the laser power, the camera gain and/or the exposure time may be concurrently adjusted. In this case, the intensity of the laser line is estimated based on the decrease of the laser power, the camera gain and/or the exposure time and the amount by which the laser power, the camera gain and/or the exposure time must be decreased for the intensity of the laser to reach its target value may be calculated prior to any parameter adjustment.

Referring back to FIG. 4, if the calculated amplification factor is greater than the reference amplification factor, the first step 36 consists in increasing the exposure time of the camera while maintaining the exposure time at most equal to the maximum exposure time.

If the target intensity for the laser line can be reached while maintaining the exposure time of the camera at most equal to the maximum exposure time, the method 18a stops.

If the intensity of the laser line is still less than the target intensity for the laser line while the exposure time has reached the maximum exposure time, then the camera gain is increased at step 38.

If the target intensity for the laser line can be reached while maintaining the camera gain at most equal to the maximum camera gain, the method 18a stops.

If the intensity of the laser line is still less than the target intensity for the laser line while the camera gain has reached the maximum camera gain, then the laser power is increased at step 40 until the intensity of the laser line reaches the target intensity. As soon as the intensity of the laser line has reached the target intensity, the increase of the laser power is stopped.

In one embodiment, the laser power must remain at most equal to the maximum laser power. In this case, if at step 40 the laser power has been increased up to the maximum laser power and the intensity of the laser line is still less than the target intensity, no more action is taken.

In one embodiment, the steps 36-40 are iteratively performed. In this case, the intensity of the laser line may be measured during execution of the method to determine whether the target intensity has been reached. In another example, the intensity of the laser line may be estimated using the new value for the first parameter to be adjusted and if the new value for the intensity of the laser line is still less than the target intensity and the first parameter is set to its maximum value, then a new value for the second parameter to be adjusted is determined and the impact on the intensity of the laser line is estimated. Doing so, it is possible to estimate the value of the intensity of the laser line as a function of the increase of the parameter(s) and to determine, prior to any parameter adjustment, which parameter should be adjusted and the amount of required adjustment so that the intensity of the laser line reaches its target value.

In another embodiment, the steps 36-40 may be concurrently performed, i.e. the laser power, the camera gain and/or the exposure time may be concurrently adjusted. In this case, the intensity of the laser line is estimated based on the increase of the exposure time, the camera gain and/or the laser power and the amount by which the laser power, the camera gain and/or the exposure time must be increased for the intensity of the laser to reach its target value may be calculated prior to any parameter adjustment.

Figure 5:
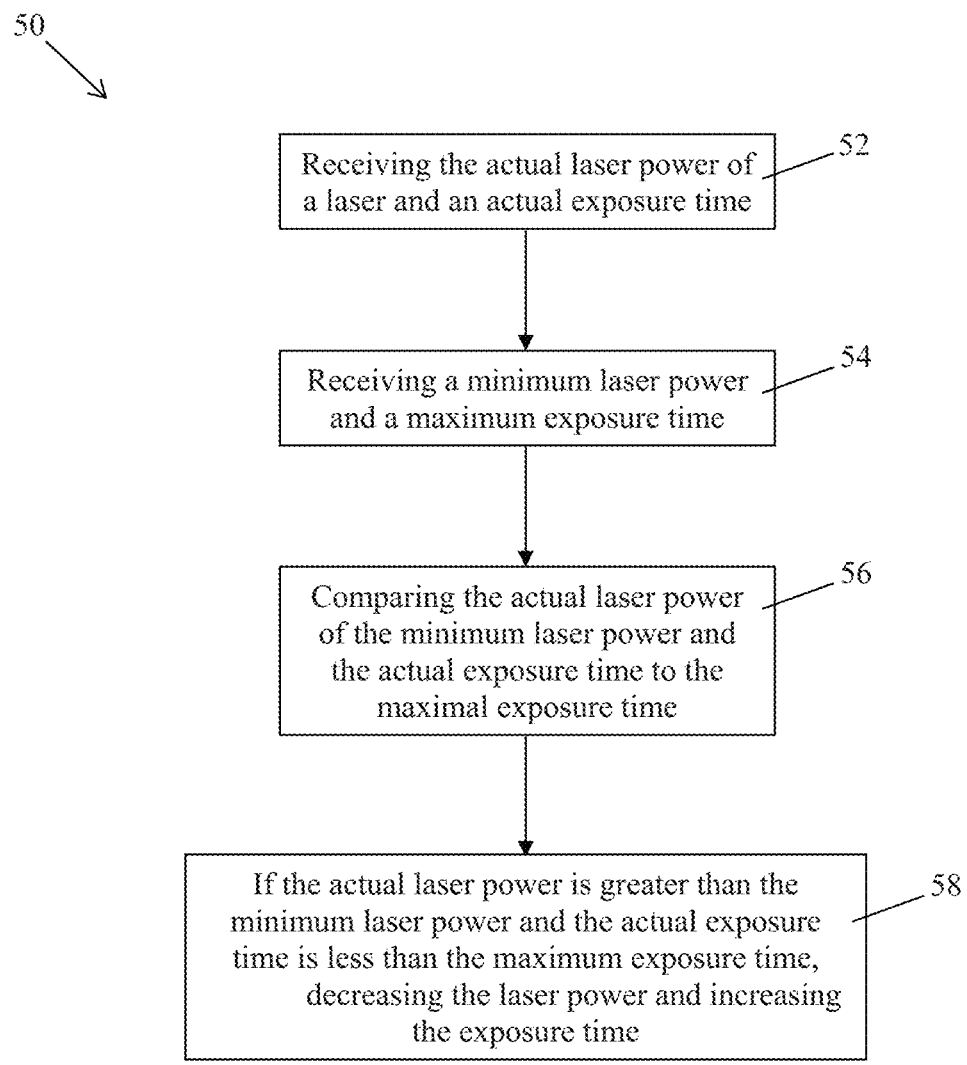
FIG. 5 is a flow chart illustrating a method for controlling a 3D profiler, in accordance with a second embodiment.

FIG. 5 illustrates a further method 50 for controlling a laser profiler while minimizing laser power consumption. The method 50 may use along with the method 10. For example, the method 50 may be first executed and then the method 10 may be executed. In an example, the method 50 may be executed several times iteratively before executing the method 10. In another example, the method 50 may be executed once before the method 10 be executed and the combination of the methods 50 and 10 may be iteratively repeated.

In an embodiment in which the profile rate varies in time and since the maximum exposure time depends on the profile rate, the method 50 is repeated either iteratively in a stepwise manner or continuously in time. The profile rate corresponds to the number of 3D profiles generated per second. The profile rate is directly related to the camera image acquisition rate, which is the number of images acquired by the camera per second. The camera image acquisition rate is also referred to as the camera frame rate. In one embodiment, the profile rate equals the camera frame rate. In this case, one profile is generated for each camera frame. In another embodiment, the profile rate may less or greater than the camera frame rate. In some profiler configurations, more or less than one profile may be generated per camera frame. However, the profile rate remains directly related to the frame rate. For any specific region of a camera sensor, the exposure time cannot exceed 1/F second, F being the frame rate, expressed in Hertz. Typically, the maximum exposure time is less than 1/F due to some physical and implementation constraints specifics to each camera model. The exact relation between the maximum exposure time and the frame rate is known for a specific camera model and the most common form corresponds to the following equation:

$$T_{max}=1/F-C$$

where C is a time constant in second.

Similarly to the method 10, the method 50 may be implemented by a computer machine At step 52, the actual laser power of the laser and the actual exposure time of the camera are received.

At step 54, a minimum value for the laser power, i.e. the minimum laser power, and a maximum value for the exposure time of the camera, i.e. the maximum exposure time, are received.

At step 56, the actual laser power is compared to the minimum laser power and the actual exposure time of the camera is compared to the maximal exposure time.

If the actual laser power is greater than the minimum laser power and the actual exposure time of the camera is less than the maximal exposure time, the laser power is decreased and the exposure time is increased, thereby minimizing the laser power consumption since the increase of the exposure time compensates for the decrease of the laser power. In one embodiment, the laser power is decreased and the exposure time is increased so that the intensity of the laser line remains constant.

In one embodiment, the decrease of the laser power and the increase of the exposure time of the camera are performed concurrently.

In one embodiment, the laser power is set to the minimum laser power if the difference between the actual exposure time and the maximum exposure time is large enough to allow it.

In one embodiment, the method 50 may be embodied as a computer-implemented method. In this case, the step 58 consists in transmitting to the controller of the laser profiler a command indicative of the decrease of the laser power and the increase of the exposure time.

In a further embodiment, the method 50 may be embodied as a computer program product comprising a non-volatile computer readable memory storing computer executable instructions thereon that when executed by a computer perform steps 50-56 in addition to a step of outputting a command indicative of the decrease of the laser power and the increase of the exposure time.

Figure 6:
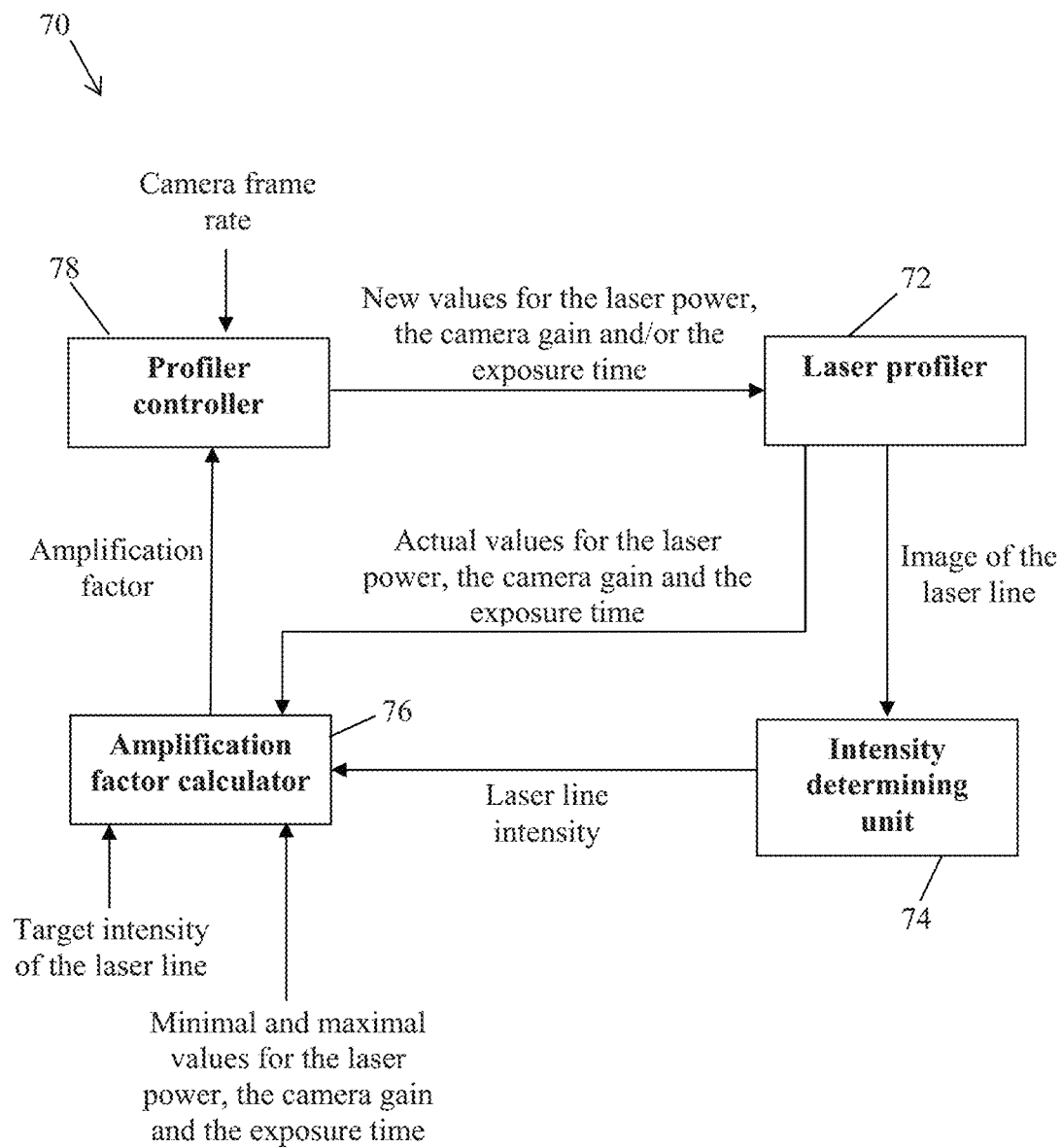
FIG. 6 is a block diagram illustrating a system for controlling a 3D laser profiler, in accordance with an embodiment.

FIG. 6 illustrates one embodiment of a system 70 for controlling a laser profiler 72. The laser controller comprises at least a laser and optics for generating a laser line and a camera for imaging the laser line of a surface to be analyzed.

The system 70 comprises an intensity determining unit 74, an amplification factor calculator 76 and a profiler controller 78 for controlling the laser profiler 72.

When in operation the laser profiler 72 images the surface to be analyzed and generates an image of the laser line on the surface to be analyzed. The intensity determining unit 74 is configured for receiving the image of the laser line from the laser profiler 72 and determining the actual intensity of the laser line from the received image. It should be understood that any adequate method for determining the intensity of a laser line from an image thereof may be used, such as the method described above. The determined actual intensity of the laser line is then transmitted to the amplification factor calculator 76.

The amplification factor calculator 76 is configured for receiving the actual intensity of the laser line from the intensity determining unit 74 and a target intensity for the laser line. The amplification factor calculator 76 is further configured for calculating an amplification factor using the actual intensity of the laser line and the target intensity for the laser line. As described above, the amplification factor is indicative as to whether the intensity of the laser should be decreased or increased or should remain unchanged.

In one embodiment, the amplification factor calculator 76 is further configured for receiving boundary or threshold values for the laser power, the camera gain and the exposure time of the camera, i.e. a minimum and a maximum values for the laser power, the camera gain and the exposure time of the camera, and for calculating the amplification factor further based on the received threshold values for the laser power, the camera gain and the exposure time of the camera. For example, such additional inputs may be received when the amplification factor calculator 76 is configured for adjusting in time the value of the target intensity for the laser line such as to minimize the use of laser power.

The profile controller 78 is configured for receiving the calculated amplification factor from the amplification factor calculator 76 and adjusting at least one parameter of the laser profiler 72 based on the received amplification factor.

In an embodiment in which the parameters of the laser profiler to be adjusted comprise the laser power, the camera gain and/or the exposure time of the camera, the profile controller 78 is configured for determining based on the amplification factor which one(s) of the laser power, the camera gain and/or the exposure time of the camera should be adjusted and the amount by which they should be adjusted, as described above.

In one embodiment, the profile controller 78 is configured for receiving the actual camera frame rate from which the actual maximum exposure time is determined. If the actual laser power is not at its minimum value and the actual exposure time is not at its maximum value, the laser power is reduced according to the available exposure time increase. This can be done sequentially or concurrently with the parameter adjustment based on the received amplification factor.

Figure 7:
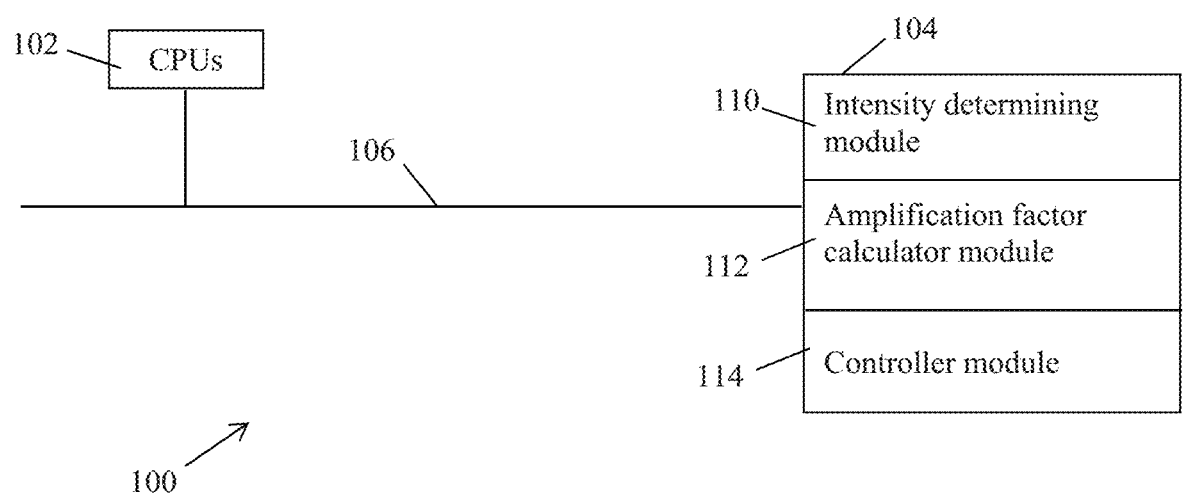
FIG. 7 is a block diagram of a processing module adapted to execute at least some of the steps of the method of FIG. 3, in accordance with an embodiment.

FIG. 7 is a block diagram illustrating an exemplary processing module 100 for executing the steps 12 to 18 of the method 10, in accordance with some embodiments. The processing module 100 typically includes one or more CPUs and/or GPUs 102 for executing modules or programs and/or instructions stored in memory 104 and thereby performing processing operations, memory 104, and one or more communication buses 106 for interconnecting these components. The communication buses 106 optionally include circuitry (sometimes called a chipset) that interconnects and controls communications between system components. The memory 104 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 104 optionally includes one or more storage devices remotely located from the CPU(s) and/or GPUs 102. The memory 104, or alternately the non-volatile memory device(s) within the memory 104, comprises a non-transitory computer readable storage medium. In some embodiments, the memory 104, or the computer readable storage medium of the memory 104 stores the following programs, modules, and data structures, or a subset thereof:

an intensity determining module 110 for receiving an image of a laser line and determining the actual intensity of the laser line;

an amplification factor calculator module 112 for determining an amplification factor for the laser line based on the actual intensity of the laser line and a target intensity for the laser line; and a controller module 114 for transforming vector representation of images or vector representations of semantic information;

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 104 may store a subset of the modules and data structures identified above. Furthermore, the memory 104 may store additional modules and data structures not described above.

Although it shows a processing module 100, FIG. 7 is intended more as functional description of the various features which may be present in a management module than as a structural schematic of the embodiments described herein. In practice, and as recognized by those of ordinary skill in the art, items shown separately could be combined and some items could be separated.

In the following, there is presented an exemplary embodiment of the method 10 using an exemplary amplification factor.

As described above, after receiving the image of the laser line, the intensity of the laser must be determined. In one embodiment, the intensity of the laser line is determined based on the intensity associated with longitudinal points located along the length of the laser line, as described above. In the present example, each longitudinal point is extracted for each active column of the image (a column representing the above-described transverse points of the laser line). The intensity value of a given longitudinal point is typically defined as being the maximum intensity value of the corresponding column.

However, it will be understood that the intensity value of a longitudinal point may be defined differently. The digital image produced by the camera is a sampled version of the physical image of the laser line on the image plane of the camera. As a result, both the exact position and the actual intensity value of the maximum of the intensity profile of the laser line along its cross-section are unknown. For a given cross-section, the actual maximum intensity may be located at the position of a photodetector or anywhere in-between two adjacent photodetectors. A maximum occurring at a photodetector location will result in an intensity measurement significantly higher than an equivalent maximum occurring exactly in-between two adjacent photodetectors. In one embodiment and to cope with that phenomenon, the intensity value of a longitudinal point may be defined in different ways. Some methods may aim at recovering the actual maximum through function fitting for instance. Some other methods may aim at attenuating the high variations of maximum intensity values by averaging the intensity readings over the close neighborhood of the point having the maximum intensity value.

Amplification Factor Computation

After determining the actual intensity of the laser line from the image, the amplification factor is to be determined. It is known that the accuracy of 3D measurements improves as the intensity of longitudinal points get higher. In effect, maximizing the intensity corresponds to a better use of the measurement range of the camera which minimizes the negative impact of quantization noise on final 3D measurement. Also, maximizing the intensity minimizes the likelihood of having points below the dim limit. On the other end, intensity values above the saturation limit should be avoided for all points of the profile.

Based on those facts, the amplification factor is defined so as to determine the intensity adjustment that will best meet all three following requirements about the intensity distribution:

maximizing the overall intensity of all longitudinal points;

avoiding points at saturation limit; and avoiding points below the Dim limit.

There exist many possibilities to achieve this goal. One of them consists in computing a global intensity value for the current profile and computing the amplification factor required to make that current value match a given intensity target. A method based on such a strategy is referred hereinafter to as a target following method. However, it should be understood that a direct intensity distribution analysis method may also be used, as described below.

Target Following Method

Within the class of target following methods, there may exist many possible ways to both define the intensity value of a given profile and define a target intensity value.

The global intensity of a profile or global intensity of a laser line, hereinafter referred to as "profile intensity", may be defined as being the mean of the intensity of all longitudinal points. It may also be the median of the intensity of all longitudinal points or any percentile rank of the distribution of the intensity value, for example.

In one embodiment, points having an intensity below the dark offset threshold are ignored in the computation of the profile intensity.

In one embodiment, the target intensity is determined based on actual data collected during test scans that are representative of the actual condition of operation of the 3D laser profiler.

In one embodiment, the target intensity is determined via "trials and errors" while performing test scans with the target following mechanism enabled. Following each trial, the distribution of the intensity value over the longitudinal points of the whole scan is analyzed and the selected target intensity is the intensity that best meets the three above mentioned criterions.

In another embodiment, the target intensity may be determined based on data collected without enabling the target following mechanism. An evaluation of how much each profile should have been amplified or attenuated with respect to their actual individual global intensity so that the result would have meet the three criterions about the intensity distribution is performed. This solution may be less precise than the previous one as some information may be lost when an important part of the intensity distribution extends outside the measurement range of the camera. For instance, if half of the points are saturated, the actual intensity distribution above saturation limit is unknown. As a result, the amount of required intensity reduction cannot be estimated accurately.

Direct Intensity Distribution Analysis Methods

The amplification factor may also be computed directly through the analysis of the distribution of intensity values. The amplification factor is then determined based on above discussed requirements. This is equivalent to continuously revising the target of the target following method described previously, but for each image.

In this method and because the analysis is performed on a per-profile basis, intensity variations from one profile to another are not accounted for. To compensate, the range of accepted values may be reduced. That is, the range usually defined to be between the dim limit and the saturation is reduced according to a given security margin.

A variant of the direct intensity distribution analysis method consists in performing the distribution analysis on the data from the N last images. This automatically accounts for intensity variations that were actually observed instead of relying on a security margin.

This variant of the direct intensity distribution analysis method is equivalent to continuously revising the target of the target following method described previously but based on the most recently collected data instead of a test scan. As a result, the intensity distribution is continuously optimized for the current conditions of operation.

Optimizing Laser Power Use

Laser operation produces heat that must be evacuated by the heat management system. When operating the laser profiler in warm environments, heat production may be a concern as the heat management system can be pushed to its limits. In that circumstances, it may be desirable to minimize laser power consumption. Minimizing laser power consumption would also have positive impact on the laser lifespan.

Minimizing laser power consumption can be achieved by respecting the three following principal means:

1—Dynamically increasing the camera exposure time whenever the camera frame rate decreases. The laser power is reduced accordingly so that the resulting profile intensity remains the same. Each triggered image capture is time stamped and the time interval between two successive images provides the instantaneous frame rate (1.0/delta T).

2—Prioritizing laser power reduction in the process of controlling the profile intensity so that it remains on target, i.e. prioritizing the exposure time and the camera gain over the laser power to increase the profile intensity and prioritizing the laser power over the camera exposure time and the camera gain to decrease the profile intensity.

The possibility of using the exposure time to increase profile intensity depends on the current camera frame rate, i.e. the exposure time is limited by the time interval between images. As a result, it may be impossible to further increase the exposure time at a given camera frame rate. Also, the exposure time may need to be reduced if the camera frame rate increases. Any such exposure time reduction needs to be compensated for through camera gain increase and/or laser power increase.

In one embodiment, the use of camera gain introduces noise in images, which may have a negative impact on the accuracy of 3D measurements. However, there usually exists a given range of camera gain values that may be used without impairing the 3D measurements. Beyond that given range, the accuracy decreases as the gain increases. To ensure best accuracy, the laser power optimization may be limited to the camera gain settings lying in that given range. In one embodiment and in order to minimize noise, the camera gain settings are maintained as low as possible by prioritizing the exposure time increase whenever the profile rate allows it.

3—Dynamically lowering the target profile intensity to reduce required laser power. As explained above, the intensity values of profile points during operation must remain within the dim limit to saturation limit interval as much as possible, while maximizing the overall intensity in order to obtain the possible accuracy for the produced 3D measurements. In situations where the distribution of intensity values is very narrow (such as the situation illustrated at FIG. 2d), the target intensity may be momentarily lowered while maintaining the distribution of the intensity values above the dim limit in order to reduce the required laser power. This dynamic target intensity reduction is performed only when the laser power is not already at its minimum value. In one embodiment, the target intensity may optionally be allowed to decrease to a level for which a part of the distribution of the intensity values falls below the dim limit.

The present exemplary method for controlling a laser profiler aims at minimizing laser power consumption during operation through at least one of the three above mentioned parameters.

Algorithm Outline

Controlling Laser Line Intensity Through Parameters with Laser Power Use Optimization Let A be the intensity amplification factor. To amplify the laser profile intensity in the image by the factor A, a set of parameters are used. In the present case, the parameters comprise:

camera time exposure (T);
camera gain (G); and
laser power (L).

Each of these three parameters have a valid range defined by the camera and laser constraints and the application:

$T_{min}$, $T_{max}$ for the camera exposure time (T);
$G_{min}$, $G_{max}$ for the camera gain (G); and
$L_{min}$, $L_{max}$ for the laser power (L).

In one embodiment, $T_{max}$ is recalculated at each iteration to ensure it remains smaller than 1/Fact due to a camera constraint. Fact is the actual image acquisition rate by the camera, which usually corresponds to the actual profile acquisition rate.

If the relation between each of these parameters has a linear effect on the laser profile intensity amplification, the amplification for the exposure time, the camera gain and the laser power may be expressed as follows:

$$A_T = \frac{T}{T_{min}}$$

$$A_G = \frac{G}{G_{min}}$$

$$A_L = \frac{L}{L_{min}}$$

The total actual amplification $A_{act}$ is given by:

$$A_{act} = A_T * A_G * A_L$$

Figure 8:
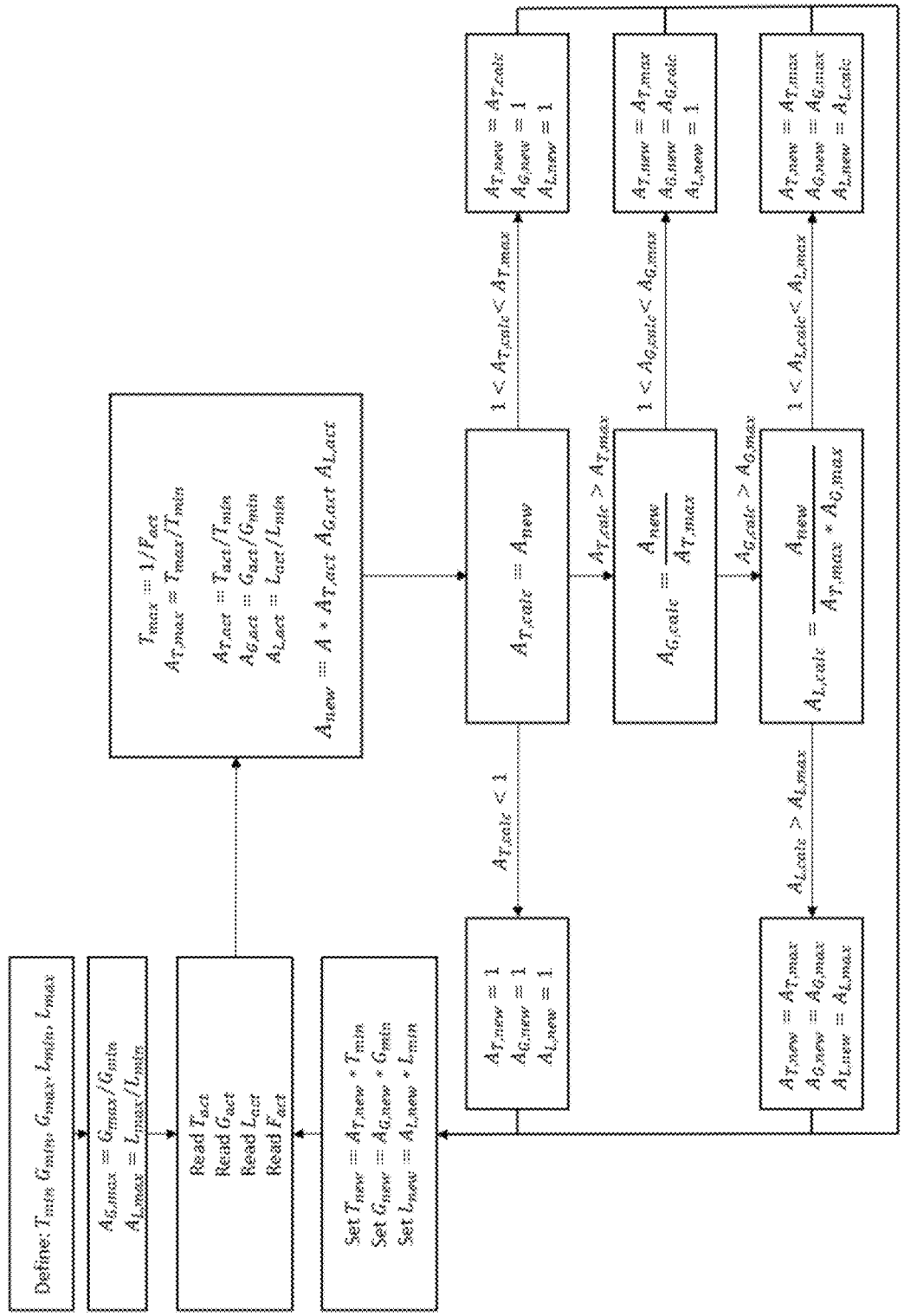
FIG. 8 illustrates a first exemplary algorithm for adjusting a laser line intensity within an image acquired by a 3D lase profiler according to a computed amplification factor.

FIG. 8 illustrates one exemplary algorithm for adjusting the laser line intensity in the image according to the computed amplification factor A through the adjustment of system parameters T, G and L while optimizing the laser power use. The laser power use optimization is obtained through the way the amplification demand is distributed across parameters. More specifically, the amplification contribution is prioritized in the following order: exposure time, camera gain and laser power, i.e. the amplification contribution from the exposure time is maximized first, then the contribution from the camera gain and finally from the laser power. As the laser power is at the end of the priority order, it is used to increase the laser line intensity only at last resort. In the diagram of FIG. 8, this translates in the fact that $A_{L,new}$ is set to 1 in the first two stages of the distribution of amplification distribution.

It should be noted that the first mean of optimizing the laser power use is realized through the fact that $A_{T,max}$ is computed at each iteration as a function of the current image acquisition rate $F_{act}$. Whenever the acquisition rate decreases, this allows for increasing the exposure time, thereby increasing $A_{T,max}$. This leaves the opportunity to increase the amplification contribution of T thus lowering the required contribution on the two remaining parameters G and L. As the contribution of G is always maximized whenever L is not at its minimum, the increase of $A_{T,max}$ have an immediate effect on L.

If the relation between the laser line amplification in the image and any of the three parameters is non-linear, then the transfer function must first be obtained. For example, this can be done by fitting a parametric model on empirical observations or using a look-up table.

$$A_T = F_T\left[\frac{T}{T_{min}}\right]$$

$$A_G = F_G\left[\frac{G}{G_{min}}\right]$$

$$A_L = F_L\left[\frac{L}{T_{min}}\right]$$

$$T = F_T^{-1}(A_T) * T_{min}$$

$$G = F_G^{-1}(A_G) * G_{min}$$

$$L = F_L^{-1}(A_L) * L_{min}$$

Figure 9:
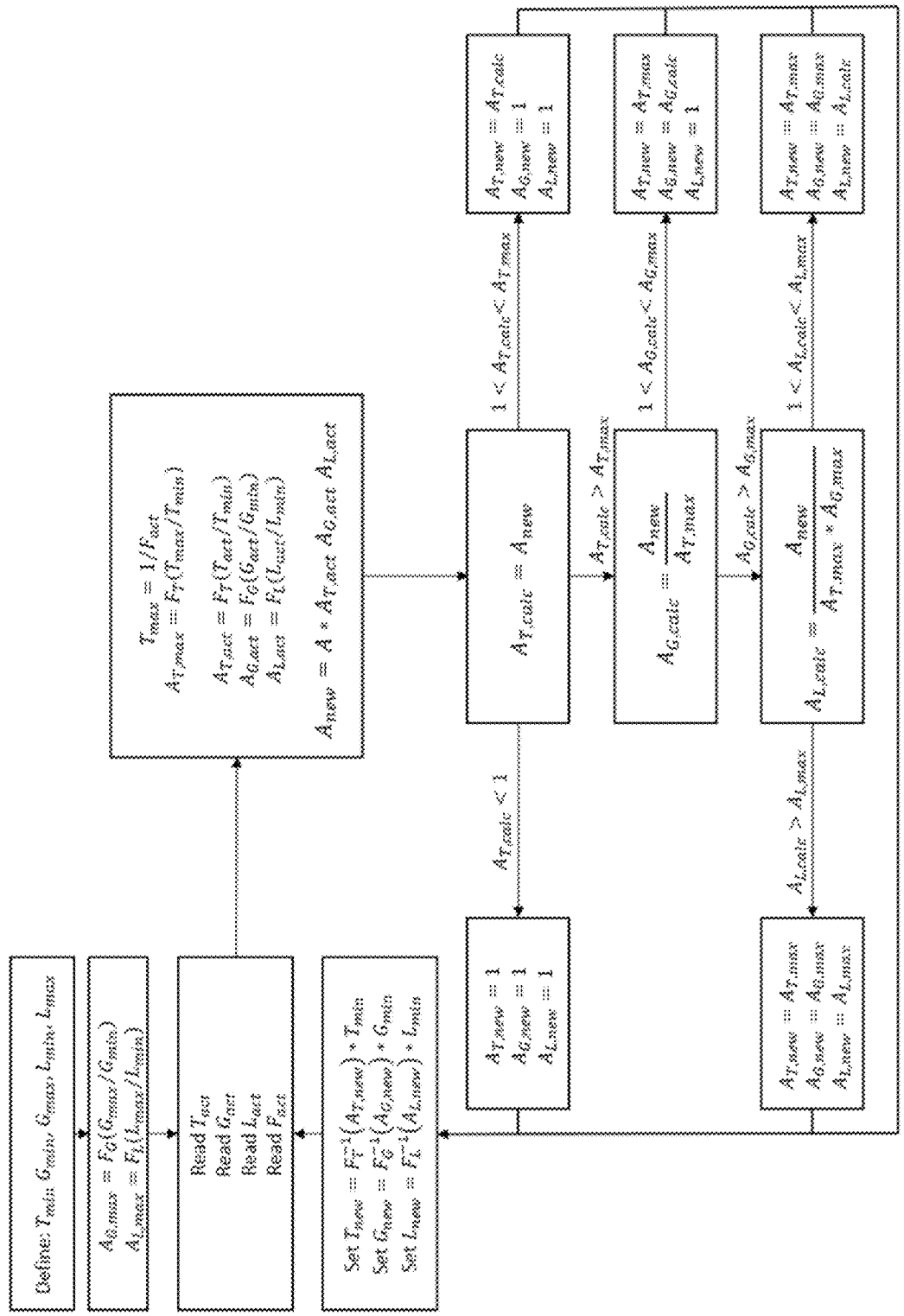
FIG. 9 illustrates a second exemplary algorithm for adjusting a laser line intensity within an image acquired by a 3D lase profiler according to a computed amplification factor.

In the case of a non-linear relation between the laser line amplification in the image and the three parameters, the algorithm depicted at FIG. 8 must include the appropriate changes as illustrated in FIG. 9.

Computing the Amplification Factor

Assuming that the target intensity $I_{target}$ has been determined for a specific application as discussed above and that the actual intensity of the laser line $I_{act}$ has been computed from the current image of the profile with any given method such as a rank percentile method, the amplification factor may be expressed as follows:

$$A = \frac{I_{target}}{I_{act}}$$

Optimizing the Laser Power Use on Narrow Intensity Distribution Conditions

A third mean of optimizing the laser power use is possible when the intensity distribution of profile points does not fully cover the dim limit to saturation limit interval, i.e. in situations for which the distribution is narrow such as the one illustrated in FIG. 2d. While it is generally better to maximize the intensity so that the accuracy of 3D measurements be maximized, decreasing the intensity may still be a valid option since the intensity values below the dim limit are, by definition, values that lead to 3D measurements within the accuracy specifications of the 3D laser profiler. Thus, whenever the laser power is not at its minimum value, shifting down a narrow intensity distribution allows to minimize laser power consumption.

Figure 10:
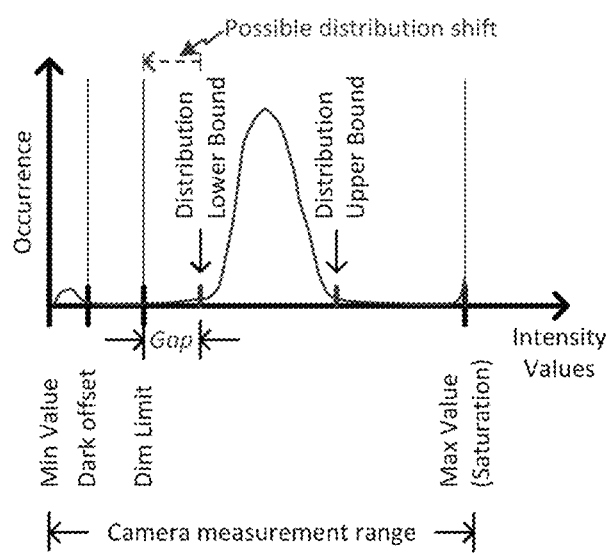
FIG. 10 illustrates an exemplary histogram of a distribution of intensity points comprising a gap between a dim limit and a lower bound of the intensity distribution.

In one embodiment, this optimization takes place in the process of computing the amplification factor as it essentially consists in lowering the amplification demand when the proper conditions are met. There are two conditions that must be concurrently met to allow for such a decrease of the laser line intensity demand:

1—There must a gap between the dim limit and the lower bound of the actual intensity distribution as illustrated in FIG. 10; and 2—The laser power must not be at its minimum value.

The second condition is important as this mean of optimizing laser power use goes against the first criterion of intensity distribution optimization which says that the intensity must be maximized. The purpose of the second condition is to ensure that the first criterion is put on hold only when required.

To ensure that the laser line intensity reduction is limited to only a value required for decreasing the laser power to its minimum, the algorithm must receive as input the actual values of the following parameters: $A_{T,act}$, $A_{G,act}$, $A_{L,act}$ and $A_{T,max}$, which are determined from the actual values of $T_{act}$, $G_{act}$, $L_{act}$ and $F_{act}$, as well as $A_{G,max}$.

The algorithm also receives as input the amplification factor A, determined as discussed above, without accounting for laser power use optimization.

A new amplification factor corresponding to the intensity change resulting from the distribution shift is introduced: $A_D$. It is set to 1 at the initialization of the control loop and it is updated at each iteration by the algorithm. The value of $A_D$ lies within the following interval: $0 < A_D \leq 1$.

The algorithm returns as output an updated version $A_{Out}$ of the amplification factor A, according to the new value of $A_D$:

$$A_{Out} = A * A_{D,new}.$$

Since $A_D \leq 1$, the resulting amplification factor $A_{Out}$ is either reduced or unchanged by the algorithm.

The algorithm increases $A_D$ toward its initial value of 1 whenever at least one of two following conditions are met:

1—The lower bound of the intensity distribution is below the dim limit; thus compromising the accuracy of the output of the 3D laser profiler; and 2—The normal amplification demand (A) can be restored, at least partially, without increasing the laser power above its minimum value.

To compute the updated value of $A_D$, we introduce $A_S$ which corresponds to the amplification factor produced by the new intensity distribution shift. The updated value of $A_D$ is related to $A_S$ by the following relation:

$$A_{D,new} = A_S * A_D$$

Since $A_D \leq 1$, the upper bound for $A_S$ is given by:

$$A_{S,max} = \frac{1}{A_D} \geq 1$$

The lower bound $A_{S,min}$ for $A_S$ is determined according to the current state of the actual intensity distribution. Referring to Erreur! Source du renvoi introuvable. FIG. 10, the lower bound $A_{S,min}$ may be expressed as follows:

$$A_{S,min} = \frac{I_{DimThreshold}}{I_{DistribLB}},$$

where $I_{DistribLB}$ is the lower bound of the intensity distribution.

$A_{S,min}$ is constrained to $A_{S,max}$:

If $A_{S,min} > A_{S,max}$, $A_{S,min} = A_{S,max}$

In an embodiment in which the actual distribution substantially covers the entire measurement range of the camera, the lower bound may be defined as the intensity corresponding to a given rank percentile of the distribution.

When $A_{S,min} \geq 1$, the lower bound of the intensity distribution is either lower than or equal to the dim limit. The laser power use optimization is thus not possible in that situation. Whenever the current value of $A_D$ is less than 1, i.e. the intensity distribution has been previously shifted down to optimize laser power use, a value of $A_{S,min} > 1$ will cause an increase of $A_D$ which will shift the intensity distribution up.

In the opposite situation when $A_{S,min} < 1$, the intensity distribution can shifted down to optimize laser power use.

In the following, the determination of $A_S$ is presented. The first step consists in determining the additional amplification factor ($A_S$) that would be required to obtain the laser power demand at its minimum value. The obtained value for $A_S$ is then constrained to the interval $[A_{S,min}, A_{S,max}]$ as a second and last step.

Referring back to FIGS. 8 and 9, we obtain:

$$A_{new} = A * A_{T,act} A_{G,act} A_{L,act}$$

In the context of the present algorithm, A of the previous equation corresponds to $A_{out}$, which gives:

$$A_{new} = (A * A_{D,new}) A_{T,act} A_{G,act} A_{L,act}$$

By replacing $A_{D,new}$, we obtain:

$$A_{new} = (A * A_S * A_D) * A_{T,act} A_{G,act} A_{L,act}$$

Assuming that the contribution of the laser to the intensity amplification is at its minimum ($A_{L,calc} = 1$) and that the contribution from the camera gain and exposure time are at their maximum and referring back again to FIGS. 8 and 9, we have:

$$A_{L,calc} = \frac{A_{new}}{A_{T,max} * A_{G,max}} = 1$$

From which we obtain:

$$A_S = \frac{A_{T,max} * A_{G,max}}{(A * A_D) * A_{T,act} A_{G,act} A_{L,act}}$$

Without accounting for $[A_{S,min}, A_{S,max}]$ interval constraint, it can be said that:

1—If $A_S \geq 1$, the intensity distribution does not need to be shifted since the current amplification ($A * A_D$) will be realized by the exposure time and/or camera gain, i.e. the step of computing $A_{L,calc}$ in the algorithms of FIGS. 8 and 9 will not be reached, thus leaving $A_{L,new} = 1$. If $A_S > 1$ and $A_{S,max} > 1$, the intensity distribution will be shifted up.

2—If $A_S < 1$, the intensity distribution needs to be shifted down. However, $A_{S,min}$ may prevent this shift to occur if the state of the intensity distribution does not have the necessary gap between the dim limit and the lower bound of the distribution Now constraining $A_S$ in the $[A_{S,min}, A_{S,max}]$ interval:

If $A_S < A_{S,min}$, $A_S = A_{S,min}$

Else if $A_S > A_{S,max}$, $A_S = A_{S,max}$

Otherwise, $A_S$ is unchanged

From $A_S$, $A_D$ is updated:

$$A_{D,new} = A_S * A_D$$

The modified amplification factor $A_{out}$ corresponding to the output of the algorithm is then given by:

$$A_{out} = A_{D,new} A$$

In one embodiment, the intensity distribution analysis is performed on intensity data accumulated from many profiles. The number of profiles may vary and depend upon the specific application. It should be understood that the data used to perform the analysis should be representative of the surface being scanned so that the intensity values of the upcoming profiles points will most likely fall within the current distribution. There exist many schemes of cumulating statistics about past data. For example, it can be "keep them all", "keep data covered by a sliding window of N profiles", "weighed sliding window". In the latter one, a weighting is used to make the older data gradually accounting for less in the current statistics.

Figure 11:
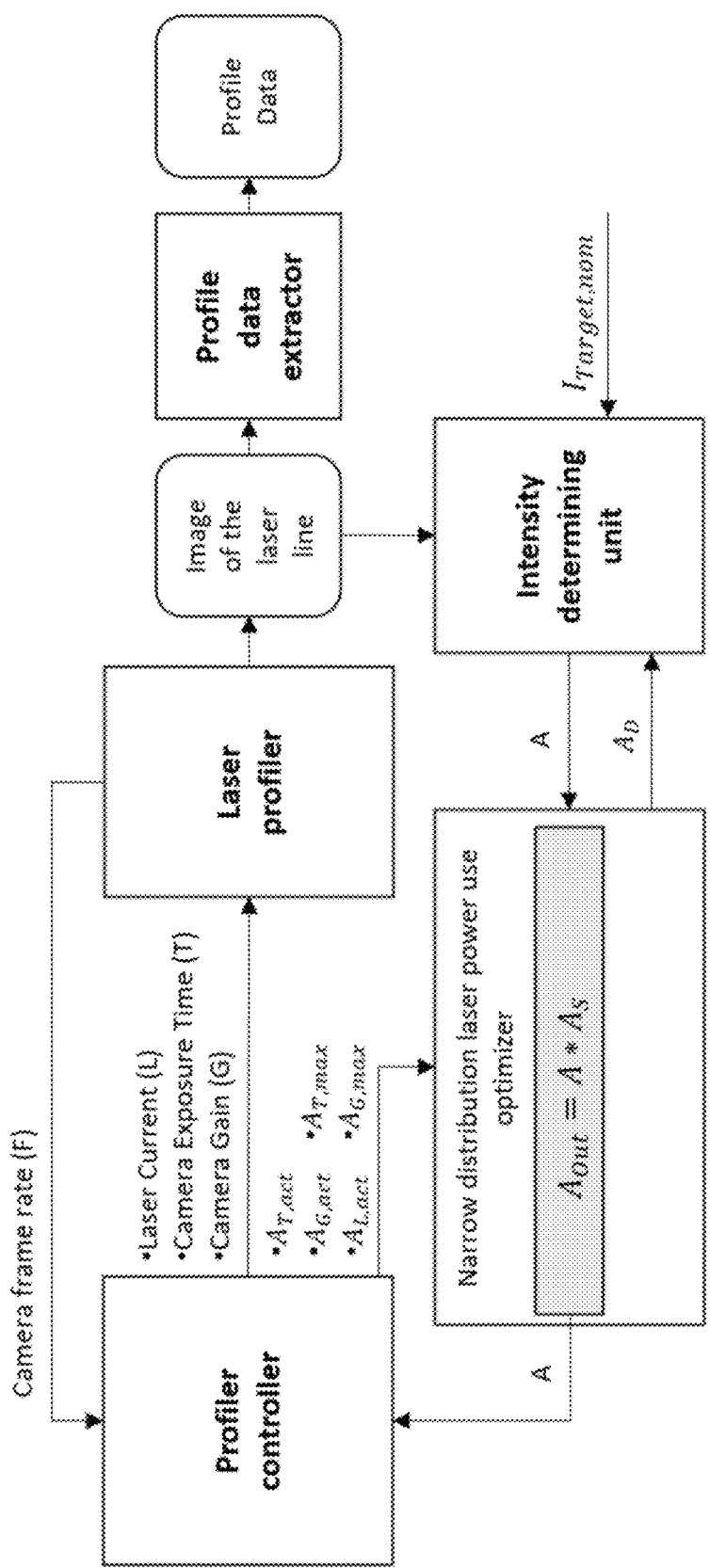
FIG. 11 illustrates the operation a system for controlling a 3D laser profiler with laser power optimization, in accordance with an embodiment.

With the addition of this laser power optimization, the laser intensity control process takes the form of the algorithm illustrated at FIG. 11.

Target Following Method

When a target following method is used for the amplification factor computation, the algorithm for optimizing laser power use on narrow intensity distribution remains essentially the same while some minor adaptations are required.

First, the algorithm must provide at the output an updated target intensity value in addition to the updated amplification factor. Second, the algorithm requires two additional inputs: $I_{Target,act}$, the actual target intensity, and $I_{Target,nom}$, the nominal target intensity. The first one corresponds to the updated target value computed at previous iteration while the second one corresponds to the intensity target initially defined.

In the context of a target following method, the amplification factor A received at the input already account for the intensity distribution shift made at previous iterations, i.e. the amplification factor is computed based on the modified target intensity $I_{Target,act}$ instead of the nominal target intensity $I_{Target,nom}$. As a result, $A_D$ must be removed from the equations. It is worth noticing that the ratio $I_{Target,act}/I_{Target,nom}$ is essentially taking the role of $A_D$ in the task of carrying the information about the currently applied shift on the intensity distribution from one iteration to the other.

In the following, the equations adapted to the context of target following method are given.

$A_{S,max}$ is now defined from $I_{Target,nom}$ and $I_{Target,act}$:

$$A_{S,max} = \frac{I_{Target,nom}}{I_{Target,act}} >= 1$$

$A_{S,min}$ is unchanged:

$$A_{S,min} = \frac{I_{DimThreshold}}{I_{DistribLB}}.$$

The final amplification factor is given by:

$$A_{Out} = A*A_S$$

Replacing $A_{Out}$ into the equation of FIGS. 8 and 9 gives:

$$A_{new} = A_{Out}*A_{T,act}A_{G,act}A_{L,act}$$

$$A_{new} = (A*A_S)*A_{T,act}A_{G,act}A_{L,act}$$

Assuming that the contribution of the laser to the intensity amplification is at its minimum ($A_{L,calc}=1$) and that the contribution from the camera gain and exposure time are at their maximum and referring again to FIGS. 8 and 9, we have:

$$A_{L,calc} = \frac{A_{new}}{A_{T,max}*A_{G,max}} = 1$$

From which we obtain:

$$A_S = \frac{A_{T,max}*A_{G,max}}{(A)*A_{T,act}A_{G,act}A_{L,act}}$$

Now constraining $A_S$ in the $[A_{S,min}, A_{S,max}]$ interval:

If $A_S < A_{S,min}$, $A_S = A_{S,min}$

Else if $A_S > A_{S,max}$, $A_S = A_{S,max}$

Otherwise, $A_S$ is unchanged

The two output of the algorithm are given by:

$$A_{out} = A*A_S$$

$$I_{Target,out} = A_S I_{Target,act}$$

Figure 12:
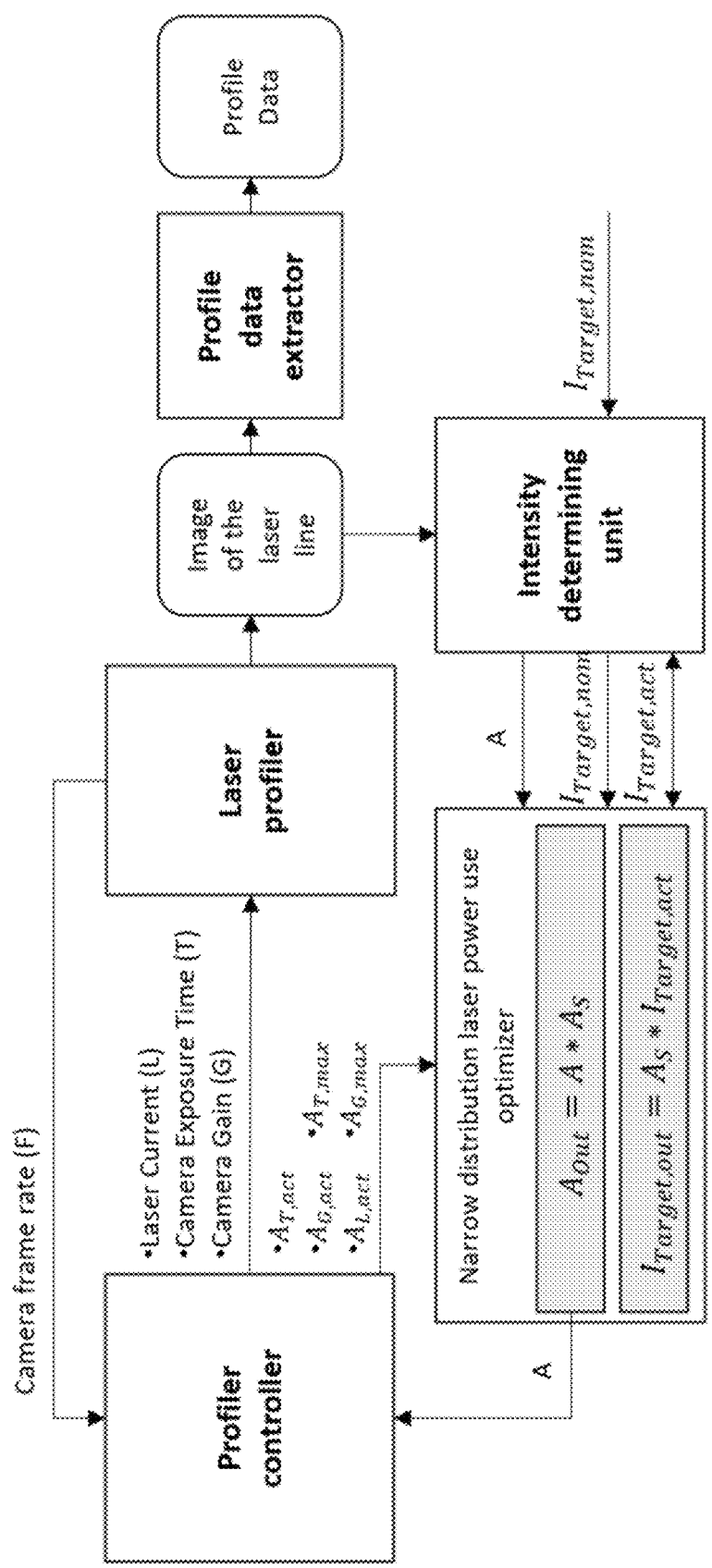
FIG. 12 illustrates the operation a system for controlling a 3D laser profiler in the case of a target following method, in accordance with an embodiment.

For the case of target following methods, the laser intensity control process takes the form shown at FIG. 12.

The embodiments of the invention described above are intended to be exemplary only. The scope of the invention is therefore intended to be limited solely by the scope of the appended claims.

We claim:

1. A method for dynamically controlling a laser profiler, the laser profiler being configured for generating a laser line on a surface being inspected and comprising at least a laser and a camera, the method comprising:
   receiving an image of the laser line on the surface being inspected;
   determining an actual intensity of the laser line in the received image;
   calculating an amplification factor for the laser line based on the actual intensity of the laser line in the image, a target intensity for the laser line in the image, a power of the laser, a camera gain of the camera and an exposure time of the laser line on the surface being inspected, the amplification factor allowing the actual intensity of the laser line to reach the target intensity while minimizing the power of the laser; and
   based on the calculated amplification factor, adjusting at least one parameter of the laser profiler so that the actual intensity of the laser line corresponds to the target intensity.

2. The method of claim 1, wherein said adjusting the at least one parameter of the laser profiler comprises varying at least one of the power of the laser, the camera gain and the exposure time.

3. The method of claim 2, wherein, when the calculated amplification factor is less than one, said varying the at least one of the power of the laser, the camera gain and the exposure time comprises:
   decreasing the power of the laser;
   if the power of the laser has reached a minimum power value, decreasing the camera gain; and
   if the camera gain has reached a minimum gain value, decreasing the exposure time.

4. The method of claim 2, further comprising when the amplification factor is greater than one:
   increasing the exposure time;
   if the exposure time has reached a maximum time value, increasing the camera gain; and
   if the camera gain has reached a maximum gain value, increasing the power of the laser.

5. The method of claim 2, wherein said adjusting the at least one parameter of the laser profiler comprises:
   comparing the power of the laser to a minimum power laser and the exposure time to a maximum exposure time; and
   if the power of the laser is greater than the minimum power laser and the exposure time is less than the maximum exposure time, concurrently decreasing the power of the laser and increasing the exposure time.

6. The method of claim 5, wherein said comparing and said concurrently decreasing the power of the laser and increasing the exposure time are performed prior to said receiving the target intensity and said receiving the image of the laser line.

7. The method of claim 1, further comprising:
varying the target intensity for the laser line.

8. The method of claim 1, wherein the laser line comprises plurality of longitudinal points therealong and the actual intensity of the laser line is determined based on an intensity value assigned to each one of the longitudinal points.

9. The method of claim 8, wherein the intensity value for a given one of the longitudinal points corresponds to a maximum intensity for transverse points of the laser line contained in a cross-section of the laser line at the given one of the longitudinal points.

10. The method of claim 8, wherein the actual intensity of the laser line corresponds to a predefined percentile rank of a distribution of the intensity values of the longitudinal points.

11. A system for dynamically controlling a laser profiler, the laser profiler being configured for generating a laser line on a surface being inspected and comprising at least a laser and a camera, the system comprising:
an intensity determining unit for:
  receiving an image of the laser line on the surface being inspected; and
  determining an actual intensity of the laser line in the received image;
an amplification factor calculator for:
  receiving a target intensity for the laser line in the image; and
  calculating an amplification factor for the laser line based on the actual intensity of the laser line in the image, the target intensity for the laser line in the image, a power of the laser, a camera gain of the camera and an exposure time of the laser line on the surface being inspected, the amplification factor allowing the actual intensity of the laser line to reach the target intensity while minimizing the power of the laser; and
a controller for:
  adjusting at least one parameter of the laser profiler based on the calculated amplification factor, so that the actual intensity of the laser line corresponds to the target intensity.

12. The system of claim 11, wherein the controller is configured for varying at least one of the power of the laser, the camera gain and the exposure time.

13. The system of claim 12, wherein, when the calculated amplification factor is less than one, the controller is configured for:
decreasing the power of the laser;
if the power of the laser has reached a minimum power value, decreasing the camera gain; and
if the camera gain has reached a minimum gain value, decreasing the exposure time.

14. The system of claim 12, wherein when the amplification factor is greater than one, the controller is further configured for:
increasing the exposure time;
if the exposure time has reached a maximum time value, increasing the camera gain; and
if the camera gain has reached a maximum gain value, increasing the power of the laser.

15. The system of claim 12, wherein the controller is configured for:
comparing the power of the laser to a minimum power laser and the exposure time to a maximum exposure time; and
if the power of the laser is greater than the minimum power laser and the exposure time is less than the maximum exposure time, concurrently decreasing the power of the laser and increasing the exposure time.

16. The system of claim 15, wherein the controller is configured for executing said comparing and said concurrently decreasing the power of the laser and increasing the exposure time prior to said receiving the target intensity and said receiving the image of the laser line.

17. The system of claim 11, the amplification factor calculator is further configured for:
varying the target intensity for the laser line.

18. The system of claim 11, wherein the laser line comprises plurality of longitudinal points therealong and the intensity determining unit is configured for determining the actual intensity of the laser line based on an intensity value assigned to each one of the longitudinal points.

19. The system of claim 18, wherein the intensity value for a given one of the longitudinal points corresponds to a maximum intensity for transverse points of the laser line contained in a cross-section of the laser line at the given one of the longitudinal points.

20. The system of claim 18, wherein the actual intensity of the laser line corresponds to a predefined percentile rank of a distribution of the intensity values of the longitudinal points.

21. A computer program product comprising a non transitory computer readable memory storing computer executable instructions thereon that when executed by a computer perform steps of:
receiving an image of a laser line on a surface being inspected;
determining an actual intensity of the laser line in the received image;
calculating an amplification factor for the laser line based on the actual intensity of the laser line in the image, a target intensity for the laser line in the image, a power of a laser, a camera gain of a camera and an exposure time of the laser line on the surface to bobeing inspected, the amplification factor allowing the actual intensity of the laser line to reach the target intensity while minimizing the power of the laser;
outputting the calculated amplification factor; and
based on the calculated amplification factor, adjusting at least one parameter of a laser profiler so that the actual intensity of the laser line corresponds to the target intensity.

22. The computer program product of claim 21, wherein the step of outputting the calculated amplification factor comprises determining an adjustment for at least one parameter of the laser profiler based on the calculated amplification factor so that the actual intensity of the laser line corresponds to the target intensity, and outputting a command indicative of the adjustment for the at least one parameter of the laser profiler.

* * * * *